United States Patent
Chiu

(10) Patent No.: US 7,706,929 B2
(45) Date of Patent: Apr. 27, 2010

(54) PREHEATING CONTROL SYSTEM OF INFORMATION PROCESSING DEVICE AND CONTROL METHOD THEREOF

(75) Inventor: Chia-Chang Chiu, Tucheng (TW)

(73) Assignee: Getac Technology Corporation, Hsinchu (TW)

( * ) Notice: Subject to any disclaimer, the term of this patent is extended or adjusted under 35 U.S.C. 154(b) by 174 days.

(21) Appl. No.: 11/966,261

(22) Filed: Dec. 28, 2007

(65) Prior Publication Data

US 2008/0294295 A1 Nov. 27, 2008

(30) Foreign Application Priority Data

May 25, 2007 (CN) .................. 2007 1 0028189

(51) Int. Cl.
*G05D 23/00* (2006.01)
(52) U.S. Cl. .................. 700/300; 700/79; 700/299; 360/97.02
(58) Field of Classification Search .................. 700/20, 700/79, 276, 299, 300; 360/69, 97.02, 60, 360/75; 713/300; 369/53.18, 53.21, 275.5
See application file for complete search history.

(56) References Cited

U.S. PATENT DOCUMENTS

| | | | |
|---|---|---|---|
| 4,967,155 A | | 10/1990 | Magnuson |
| 6,055,120 A * | | 4/2000 | Schirle .................. 360/73.03 |
| 6,134,667 A * | | 10/2000 | Suzuki et al. .................. 713/300 |
| 6,169,930 B1 * | | 1/2001 | Blachek et al. .................. 700/79 |
| 6,266,203 B1 * | | 7/2001 | Street et al. .................. 360/69 |
| 6,735,035 B1 * | | 5/2004 | Smith et al. .................. 360/69 |
| 7,277,251 B2 * | | 10/2007 | Ishii et al. .................. 360/75 |
| 7,365,930 B2 * | | 4/2008 | Ishii et al. .................. 360/75 |
| 7,423,832 B2 * | | 9/2008 | Buch et al. .................. 360/75 |
| 2002/0159354 A1 * | | 10/2002 | Nakabayashi .................. 369/53.18 |
| 2003/0081337 A1 * | | 5/2003 | Tanimoto .................. 360/60 |
| 2003/0081934 A1 | | 5/2003 | Kirmuss |
| 2003/0099055 A1 | | 5/2003 | Kim et al. |
| 2003/0142439 A1 | | 7/2003 | Hidaka et al. |
| 2004/0042108 A1 * | | 3/2004 | Kusuyama .................. 360/60 |
| 2006/0053316 A1 * | | 3/2006 | Yamazaki et al. .................. 713/300 |
| 2006/0274455 A1 * | | 12/2006 | Ishii et al. .................. 360/255 |
| 2007/0069913 A1 * | | 3/2007 | Hatten et al. .................. 340/691.1 |
| 2007/0083298 A1 * | | 4/2007 | Pierce et al. .................. 701/1 |
| 2007/0146923 A1 | | 6/2007 | Imai et al. |
| 2007/0153424 A1 * | | 7/2007 | Sullivan et al. .................. 360/245 |
| 2007/0153425 A1 * | | 7/2007 | Sullivan et al. .................. 360/245 |
| 2007/0153473 A1 * | | 7/2007 | Sullivan et al. .................. 361/687 |
| 2007/0268611 A1 * | | 11/2007 | Buch et al. .................. 360/75 |

FOREIGN PATENT DOCUMENTS

WO WO 2006108294 (A1) 10/2006

* cited by examiner

*Primary Examiner*—Charles R Kasenge
(74) *Attorney, Agent, or Firm*—Quintero Law Office, PC

(57) ABSTRACT

A preheating control system of an information processing device and a control method thereof are described. The system includes a temperature sensing module, a first controller, a heating module, and a second controller. After receiving a power ON signal, the first controller shifts to a primary control mode and determines whether temperature of the hard disk satisfies an operating temperature scope or not. When the temperature does not satisfy the operating temperature scope, the heating module is used to heat the hard disk. When the temperature satisfies the operating temperature scope, the first controller shifts to a secondary control mode and activates the second controller to execute a boot program of the information processing device, thereby improving system stability.

16 Claims, 3 Drawing Sheets

PREHEATING CONTROL SYSTEM OF INFORMATION PROCESSING DEVICE AND CONTROL METHOD THEREOF

CROSS-REFERENCE TO RELATED APPLICATIONS

This non-provisional application claims priority under 35 U.S.C. §119(a) on Patent Application No(s). 200710028189.5 filed in China on May 25, 2007, the entire contents of which are hereby incorporated by reference.

BACKGROUND OF THE INVENTION

1. Field of Invention

The present invention relates to a preheating control system and a control method thereof. More particularly, the present invention relates to a preheating control system of an information processing device and a control method thereof.

2. Related Art

Information processing device must operate in a certain temperature scope, so as to assure operating accuracy thereof. Sometimes, the information processing device must operate under a low temperature environment, for example, a military or industrial computer, so before the information processing device is booted, it is necessary to maintain the internal of the information processing device in a normal operating temperature scope. Particularly, a hard disk mostly can only operate under the environment with a temperature higher than 0°, and if the temperature is lower than 0°, a risk of data loss may be resulted. For the recent method, an embedded controller (EC) can be used to output a heating control signal before the information processing device finishes a boot program, and a heating and control unit coupled to the EC is used to heat at least one internal device (e.g., the hard disk) of the information processing device according to whether the heating control signal can be enabled or not, such that the information processing device still can normally be booted and operate under the low temperature environment.

Although the EC can normally operate under the low temperature environment, when the environmental temperature is lower than a certain specific value, for example lower than −20°, the EC may be in an unstable state, such that a part of the functions cannot be normally executed. Additionally, when the EC is in the normal operation situation (that is, the information processing device is not booted, and the EC performs the preheating control procedure), the EC has a certain power consumption (mostly and approximately being 30 mA). Therefore, for a portable electronic device, the power consumption of the EC is one of the reasons affecting cell endurance ability.

SUMMARY OF THE INVENTION

In view of the above problems, the present invention is mainly directed to a preheating control system of an information processing device and a control method thereof. A preheating control procedure is finished by using a first controller with low power consumption, and a control right is returned to a second controller to execute a boot program of the information processing device, thereby improving cell endurance ability and system stability of the information processing device.

The preheating control system of the information processing device provided by the present invention includes a temperature sensing module for sensing a temperature of a hard disk; a first controller electrically coupled to the temperature sensing module and having a primary control mode and a secondary control mode, in which after receiving a power ON signal, the first controller shifts to the primary control mode, and determines whether the temperature of the hard disk satisfies an operating temperature scope or not, when the temperature does not satisfy the operating temperature scope, a heating control signal is generated, and when the temperature satisfies the operating temperature scope, an activate signal is generated; a heating module electrically coupled to the first controller, for beginning to heat according to the heating control signal to generate heat to heat the hard disk; and a second controller electrically coupled to the first controller and activated by the activate signal, in which after finishing activation, the second controller generates a finish signal to the first controller, such that the first controller shifts to the secondary control module, and the second controller executes a boot program of the information processing device, in which the first controller has a power consumption lower than that of the second controller.

The preheating control method of the information processing device provided by the present invention includes the following steps.

A power ON signal is received through a first controller, and the first controller is set to a primary control mode. Next, the first controller obtains a sensing temperature of a hard disk. The first controller determines whether the sensing temperature satisfies an operating temperature scope or not. Then, when it is confirmed that the temperature does not satisfy the operating temperature scope, the first controller activates a heating module to heat the hard disk. When it is confirmed that the temperature satisfies the operating temperature scope, the first controller activates a second controller for operation. Finally, when activation of the second controller is finished, a finish signal is generated to the first controller, such that the first controller shifts to a secondary control mode, and the second controller executes a boot program of the information processing device.

By using the preheating control system of the information processing device and the control method thereof, at least the following progressive functions can be achieved.

1. Under a condition of low temperature (e.g., lower than −20°), the information processing device still can normally perform the preheating control procedure and finish the boot program.

2. The controller having the low power consumption is adopted to finish the preheating control procedure, so as to prolong the endurance ability of the cell of the information processing device.

3. When the second controller cannot be normally activated to execute the boot program of the information processing device, the first controller is used to stop the boot program of the information processing device, so as to assure the stability of the information processing device.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
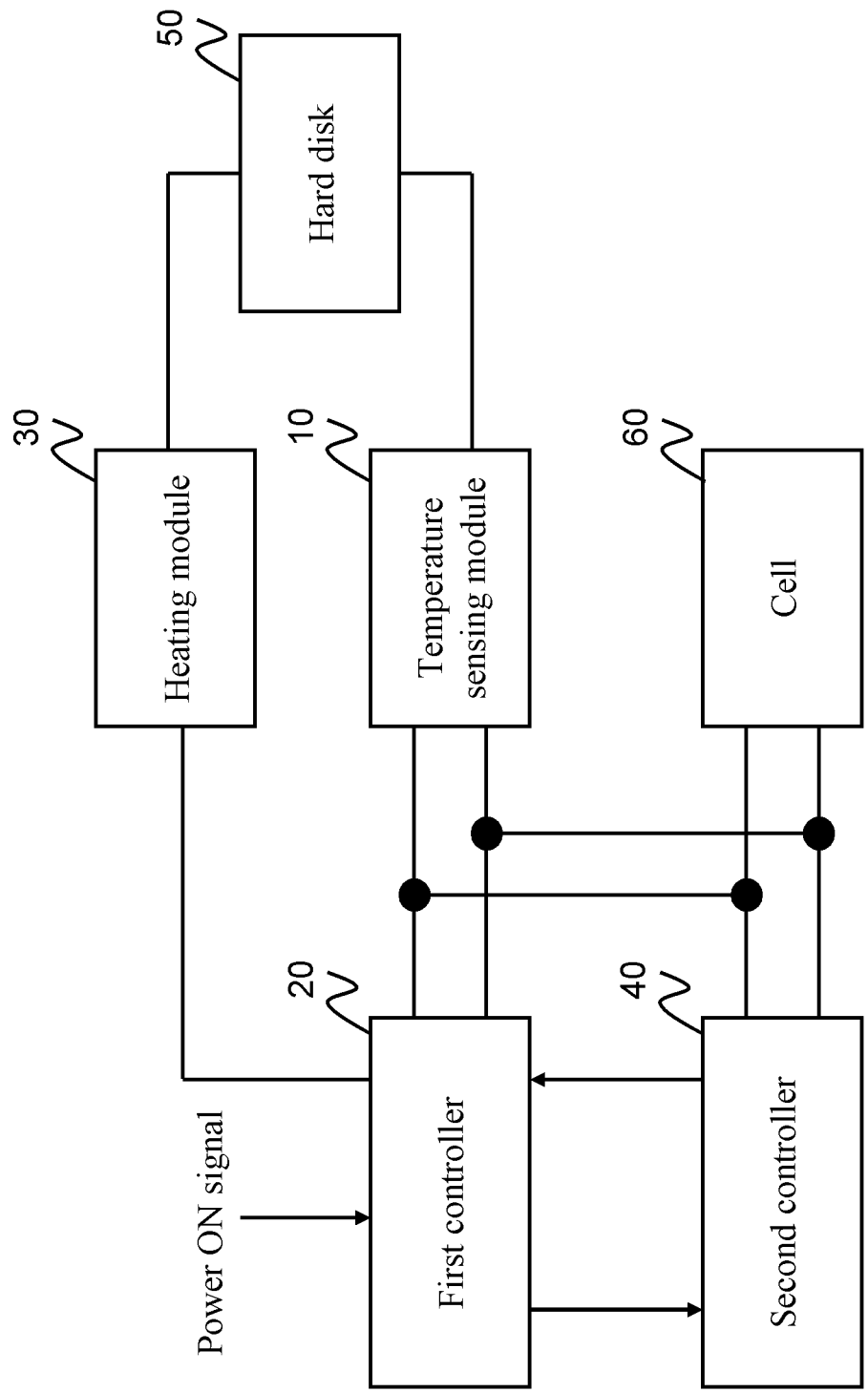
FIG. 1 is a block diagram of the system of an embodiment of the present invention.

Referring to FIG. 1, it is a block diagram of the system of an embodiment of the present invention. As shown in FIG. 1, a preheating control system of an information processing device of the present invention includes a temperature sensing module 10, a first controller 20, a heating module 30, a second controller 40, a hard disk 50, and a cell 60. Each module and each element are respectively illustrated below.

The temperature sensing module 10 is used to sense a temperature of the hard disk 50, and is installed on a case of the hard disk 50 or is embedded into the case. When an initial temperature value of the hard disk 50 is sensed, a corresponding level signal or a temperature value is generated to the first controller 20, a plurality of feedback temperature values is continuously sensed, and corresponding level signals or temperature values are generated to the first controller 20. The temperature sensing module 10 can be, for example, composed of a sensing circuit including a thermistor.

The first controller 20 is electrically coupled to the temperature sensing module 10 and has a primary control mode and a secondary control mode. When the first controller 20 is in the primary control mode, it is used to determine whether to perform a preheating control procedure and activate the second controller 40 to execute a boot program of the information processing device, according to the recent temperature of the hard disk 50 and an electric quantity of the cell 60. When the first controller 20 is in the secondary control mode, it enters a stand-by state or an off state.

After receiving a power ON signal, the first controller 20 shifts to the primary control mode and determines whether the temperature value or the level signal of the hard disk 50 obtained by the temperature sensing module 10 satisfies an operating temperature scope (e.g., a temperature higher than $-20°$). When the sensing temperature does not satisfy the operating temperature scope, a heating control signal is generated to the heating module 30. When the sensing temperature satisfies the operating temperature scope, an activate signal is generated to the second controller 40, so as to activate the second controller 40. The first controller 20 has low temperature endurance (e.g., the first controller 20 can normally operate at $-40°$) and low power consumption (e.g., the normal operation electric power consumption is approximately 9 mA to 18 mA) superior to those of the second controller 40, and the first controller 20 can be, for example, a micro processor (MP).

The heating module 30 is electrically coupled to the first controller 20, and adjacent to the hard disk 50. The heating module 30 begins heating to generate heat to heat the hard disk 50 according to the heating control signal generated by the first controller 20, and stops heating according to a stop heating control signal generated by the first controller 20. The heating module 30 can be, for example, an electrically heated wire or a ceramic heating board.

The second controller 40 is electrically coupled to the first controller 20 through an inter-integrated circuit bus (I2C bus) or a system management bus (SM bus), and is activated by the activate signal generated by the first controller 20 for operation. After finishing the activation, the second controller 40 generates a finish signal to the first controller 20, such that the first controller 20 shifts to the secondary control module, and the second controller 40 executes the boot program of the information processing device.

When the first controller 20 does not receive the finish signal generated by the second controller 40 in a predetermined time (e.g., 0.5 sec), a reset signal is generated to the second controller 40 to reactivate the second controller 40. When a number of the reactivation of the second controller 40 reaches a predetermined value (e.g., 10), the first controller 20 shifts to the primary control mode, and the first controller 20 stops the boot program of the information processing device. The second controller 40 can be, for example, an embedded controller (EC).

The hard disk 50 is used to store data, and may lose data when operating under a specific environmental temperature (e.g., lower than $0°$). The cell 60 is used to supply the power required by the operation of the information processing device. The cell 60 can be particularly applied to the portable information processing device.

The operation principle of the embodiment of the present invention is illustrated below.

After a user presses a power button of the information processing device, the first controller 20 is set to the primary control mode, obtains the recent temperature of the hard disk 50 through the temperature sensing module 10, and obtains the electric quantity of the cell 60 through the I2C bus. Next, it is determined whether the electric quantity of the cell 60 is enough for the information processing device to finish the boot program. When the electric quantity of the cell 60 satisfies a booting standard and the temperature of the hard disk 50 is lower than the operating temperature scope, the first controller 20 activates the heating module 30 to heat the hard disk 50. The recent temperature of the hard disk 50 is continuously obtained through the temperature sensing module 10. When the temperature of the hard disk 50 satisfies the operating temperature scope, the first controller 20 controls the heating module 30 stop heating, and generates the activate signal to the second controller 40, so as to activate the second controller 40.

When the second controller 40 receives the activate signal generated by the first controller 20, the activation procedure of the second controller 40 is performed, after the activation procedure is finished, the second controller 40 generates the finish signal to the first controller 20, such that the first controller 20 shifts to the secondary control mode, and the second controller 40 executes the boot program of the information processing device. When the first controller 20 does not receive the finish signal generated by the second controller 40 in a predetermined time (e.g., 0.5 sec), a reset signal is generated to the second controller 40, so as to reactivate the second controller 40. When the number of the reactivation of the second controller 40 reaches a predetermined value (e.g., 10), the first controller 20 shifts to the primary control mode, and the first controller 20 stops the boot program of the information processing device.

Figure 2A:
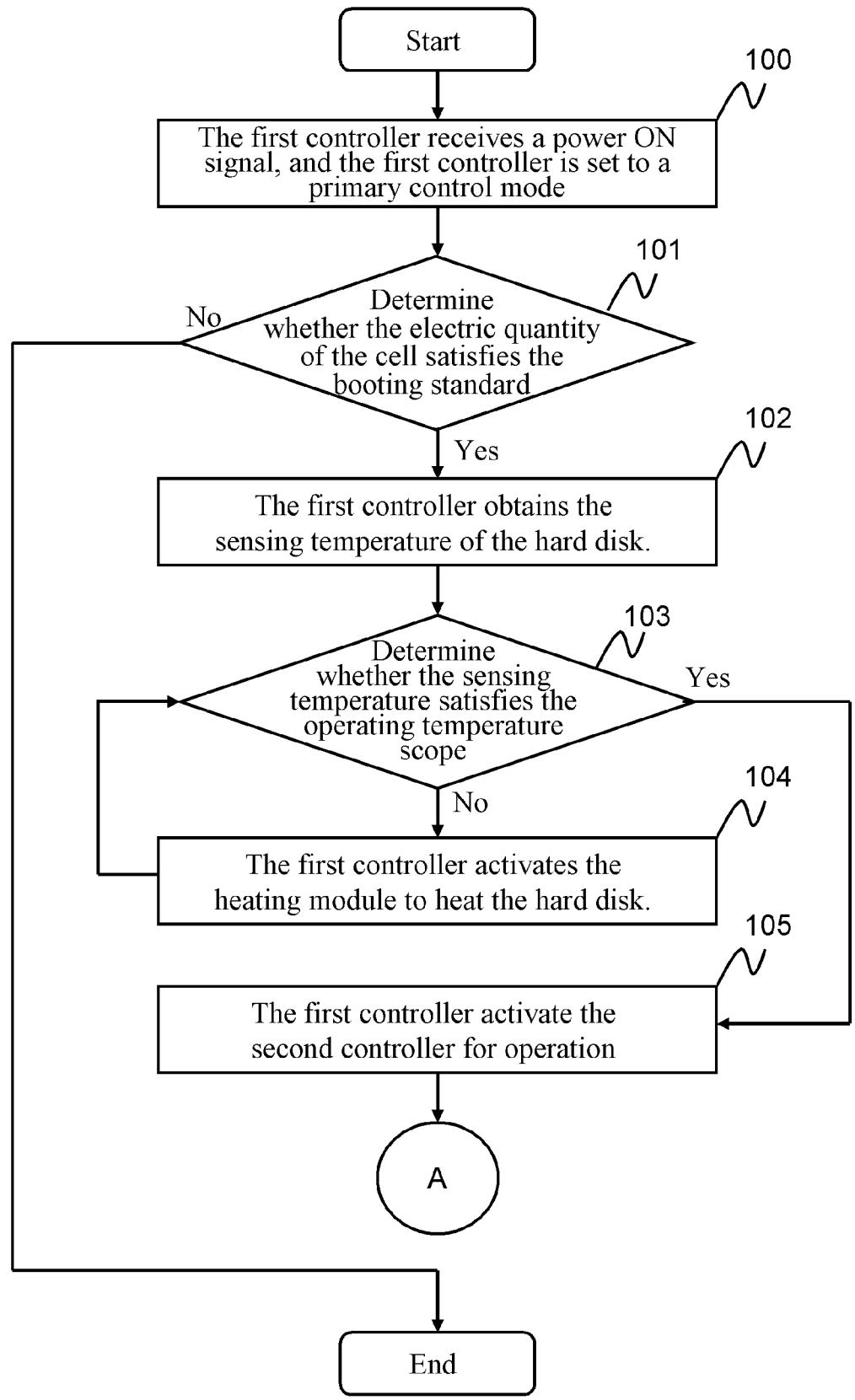
FIG. 2A is a flow chart of an embodiment of the present invention.
Figure 2B:
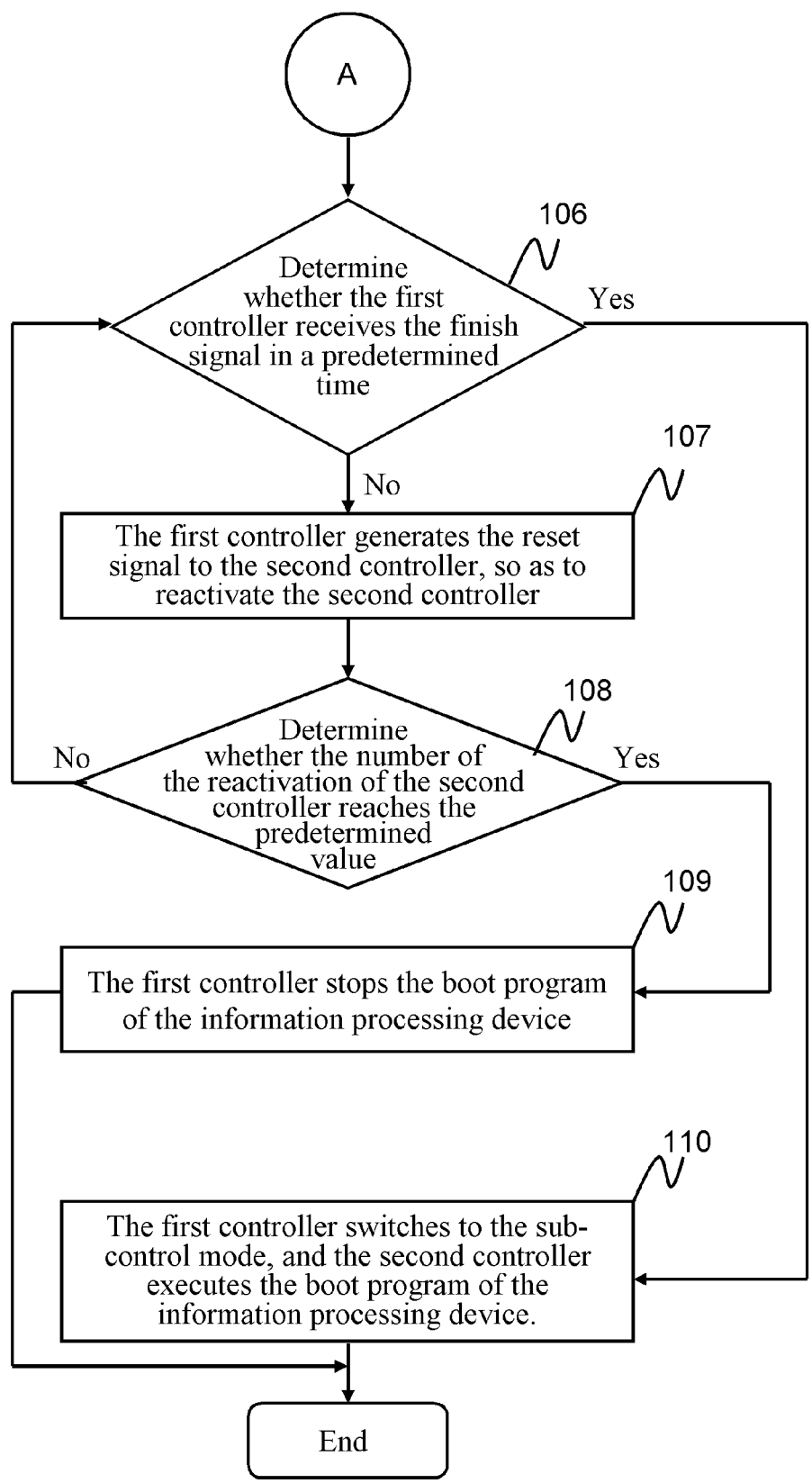
FIG. 2B is a flow chart of an embodiment of the present invention.

Referring to FIGS. 2A and 2B, flow charts of the embodiment of the present invention are shown. As shown in FIG. 2A, the preheating control method of the information processing device of the present invention includes the following steps.

Firstly, the first controller is used to receive a power ON signal, and the first controller is set to a primary control mode (step 100). Next, the first controller obtains an electric quantity of the cell through the I2C bus or the SM bus, so as to determine whether the electric quantity of the cell satisfies the booting standard (step 101). In addition, when an externally connected power source supplies power to the information processing device, the cell is not used, and step 101 can be omitted.

When it is confirmed that the electric quantity of the cell satisfies the booting standard, the first controller obtains the sensing temperature of the hard disk through the temperature sensing module (step 102), in which the first controller obtains the sensing temperature through the I2C bus or the SM bus. When it is confirmed that the electric quantity of the cell does not satisfy the booting standard, the preheating control procedure and the boot program of the information processing device are stopped.

The first controller determines whether the obtained sensing temperature satisfies the operating temperature scope of the hard disk (step 103), and the operating temperature scope can be adjusted according to practical specification and characteristic of the hard disk.

When it is confirmed that the sensing temperature does not satisfy the operating temperature scope, the first controller activates the heating module to heat the hard disk (step 104). When it is confirmed that the temperature satisfies the operating temperature scope, the first controller makes the heating module stop heating the hard disk and generates the activate signal to the second controller, so as to activate the second controller for operation (step 105).

Next, referring to FIG. 2B, it is a flow chart after FIG. 2A. As shown in FIG. 2B, the preheating control method of the information processing device of the present invention further includes the following steps.

After the first controller generates the activate signal to the second controller, the first controller determines whether the finish signal generated by the second controller is received in a predetermined time (e.g., 0.5 sec) (step 106). When the first controller does not receive the finish signal generated by the second controller in the predetermined time, the first controller generates a reset signal to the second controller, so as to reactivate the second controller (step 107). Next, it is determined whether a number of the reactivation of the second controller reaches the predetermined value (e.g., 10) (step 108). When it is confirmed that the number of reactivation of the second controller does not reach the predetermined value, the procedure returns to step 107.

When the number of the reactivation of the second controller reaches the predetermined value, and it is still impossible to normally finish the activation, the first controller stops the boot program of the information processing device (step 109).

When the first controller receives the finish signal generated by the second controller in the predetermined time, the first controller shifts to the secondary control mode, and the second controller executes the boot program of the information processing device (step 110).

To sum up, in the preheating control system of the information processing device and the control method thereof of the present invention, the information processing device can still normally perform the preheating control procedure and finish the boot program under the low temperature condition (e.g., lower than −20°). The controller having the low power consumption is adopted to finish the preheating control procedure and to prolong cell endurance ability of the information processing device. When the second controller cannot be normally activated to execute the boot program of the information processing device, the first controller stops the boot program of the information processing device, so as to assure the stability of the information processing device.

What is claimed is:

1. A preheating control system of an information processing device, comprising:
    a temperature sensing module, for sensing a temperature of a hard disk;
    a first controller, electrically coupled to the temperature sensing module, and having a primary control mode and a secondary control mode, wherein after receiving a power ON signal, the first controller shifts to the primary control mode, and determines whether the temperature of the hard disk satisfies an operating temperature scope or not, when the temperature does not satisfy the operating temperature scope, a heating control signal is generated, and when the temperature satisfies the operating temperature scope, an activate signal is generated;
    a heating module, electrically coupled to the first controller, and beginning to heat according to the heating control signal, so as to generate heat to heat the hard disk; and
    a second controller, electrically coupled to the first controller, and activated by the activate signal, wherein the second controller is configured such that after finishing activation, the second controller generates a finish signal to the first controller, such that the first controller shifts to the secondary control mode, and the second controller executes a boot program of the information processing device.

2. The preheating control system of an information processing device as claimed in claim 1, further comprising a cell, for supplying power required by operation of the information processing device.

3. The preheating control system of an information processing device as claimed in claim 2, wherein the first controller further determines whether to activate the second controller to execute the boot program of the information processing device, according to an electric quantity of the cell.

4. The preheating control system of an information processing device as claimed in claim 1, wherein the first controller has a power consumption lower than that of the second controller.

5. The preheating control system of an information processing device as claimed in claim 1, wherein the second controller is electrically coupled to the first controller through an inter-integrated circuit bus (I2C bus).

6. The preheating control system of an information processing device as claimed in claim 1, wherein the second controller is electrically coupled to the first controller through a system management bus (SM bus).

7. A preheating control method of an information processing device, comprising:
    (a) receiving a power ON signal through a first controller, and setting the first controller to a primary control mode;
    (b) the first controller obtaining a sensing temperature of a hard disk;
    (c) the first controller determining whether the sensing temperature satisfies an operating temperature scope;
    (d) the first controller activating a heating module to heat the hard disk, when confirming that the temperature does not satisfy the operating temperature scope;
    (e) the first controller activating a second controller for operation, when confirming that the temperature satisfies the operating temperature scope; and
    (f) after finishing the activation, the second controller generating a finish signal to the first controller, so as to shift the first controller to a secondary control mode, and executing a boot program of the information processing device.

8. The preheating control method of an information processing device as claimed in claim 7, wherein after step (a), the method further comprises a step of the first controller determining whether to activate the second controller to execute the boot program of the information processing device, according to an electric quantity of a cell.

9. A preheating control system of an information processing device, comprising:

a temperature sensing module, for sensing a temperature of a hard disk;

a first controller, electrically coupled to the temperature sensing module, and having a primary control mode and a secondary control mode, wherein after receiving a power ON signal, the first controller shifts to the primary control mode, and determines whether the temperature of the hard disk satisfies an operating temperature scope or not, when the temperature does not satisfy the operating temperature scope, a heating control signal is generated, and when the temperature satisfies the operating temperature scope, an activate signal is generated;

a heating module, electrically coupled to the first controller, and beginning to heat according to the heating control signal, so as to generate heat to heat the hard disk; and a second controller, electrically coupled to the first controller, and activated by the activate signal, wherein after finishing activation, the second controller generates a finish signal to the first controller, such that the first controller shifts to the secondary control mode, and the second controller executes a boot program of the information processing device;

wherein when the first controller does not receive the finish signal in a predetermined time, a reset signal is generated to the second controller, so as to reactivate the second controller; and wherein when a number of reactivation of the second controller reaches a predetermined value, the first controller shifts to the primary control mode, and stops the boot program of the information processing device.

10. The preheating control system of an information processing device as claimed in claim 9, further comprising a cell, for supplying power required by operation of the information processing device.

11. The preheating control system of an information processing device as claimed in claim 10, wherein the first controller further determines whether to activate the second controller to execute the boot program of the information processing device, according to an electric quantity of the cell.

12. The preheating control system of an information processing device as claimed in claim 9, wherein the first controller has a power consumption lower than that of the second controller.

13. The preheating control system of an information processing device as claimed in claim 9, wherein the second controller is electrically coupled to the first controller through an inter-integrated circuit bus (I2C bus).

14. The preheating control system of an information processing device as claimed in claim 9, wherein the second controller is electrically coupled to the first controller through a system management bus (SM bus).

15. A preheating control method of an information processing device, comprising:

(a) receiving a power ON signal through a first controller, and setting the first controller to a primary control mode;

(b) the first controller obtaining a sensing temperature of a hard disk;

(c) the first controller determining whether the sensing temperature satisfies an operating temperature scope;

(d) the first controller activating a heating module to heat the hard disk, when confirming that the temperature does not satisfy the operating temperature scope;

(e) the first controller activating a second controller for operation, when confirming that the temperature satisfies the operating temperature scope; and (f) after finishing the activation, the second controller generating a finish signal to the first controller, so as to shift the first controller to a secondary control mode, and executing a boot program of the information processing device, and generating a reset signal to the second controller to reactivate the second controller, when the first controller does not receive the finish signal in a predetermined time, wherein when a number of the reactivation of the second controller reaches a predetermined value, the first controller shifts to the primary control mode, and stops the boot program of the information processing device.

16. The preheating control method of an information processing device as claimed in claim 15, wherein after step (a), the method further comprises a step of the first controller determining whether to activate the second controller to execute the boot program of the information processing device, according to an electric quantity of a cell.

* * * * *